UNITED STATES PATENT OFFICE.

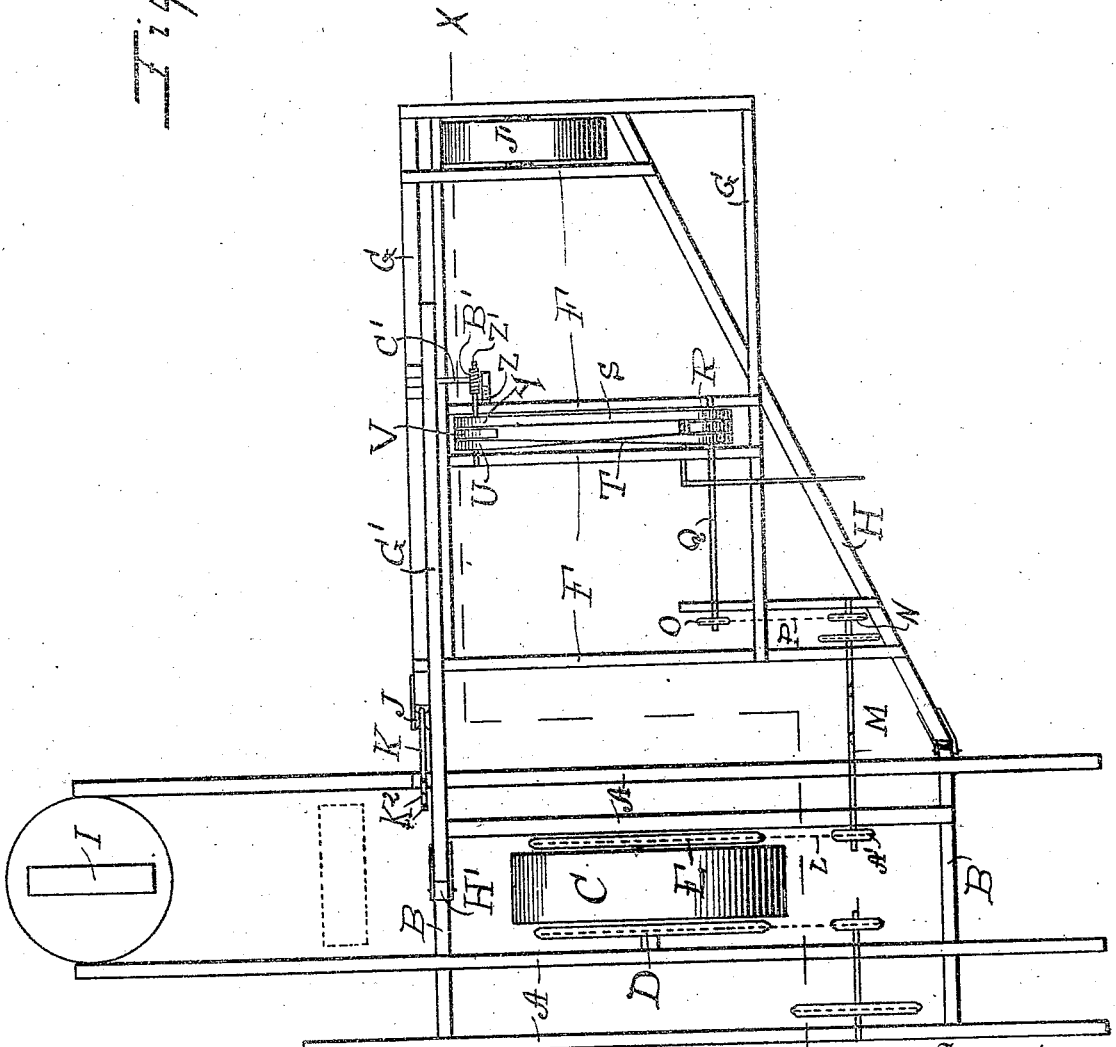

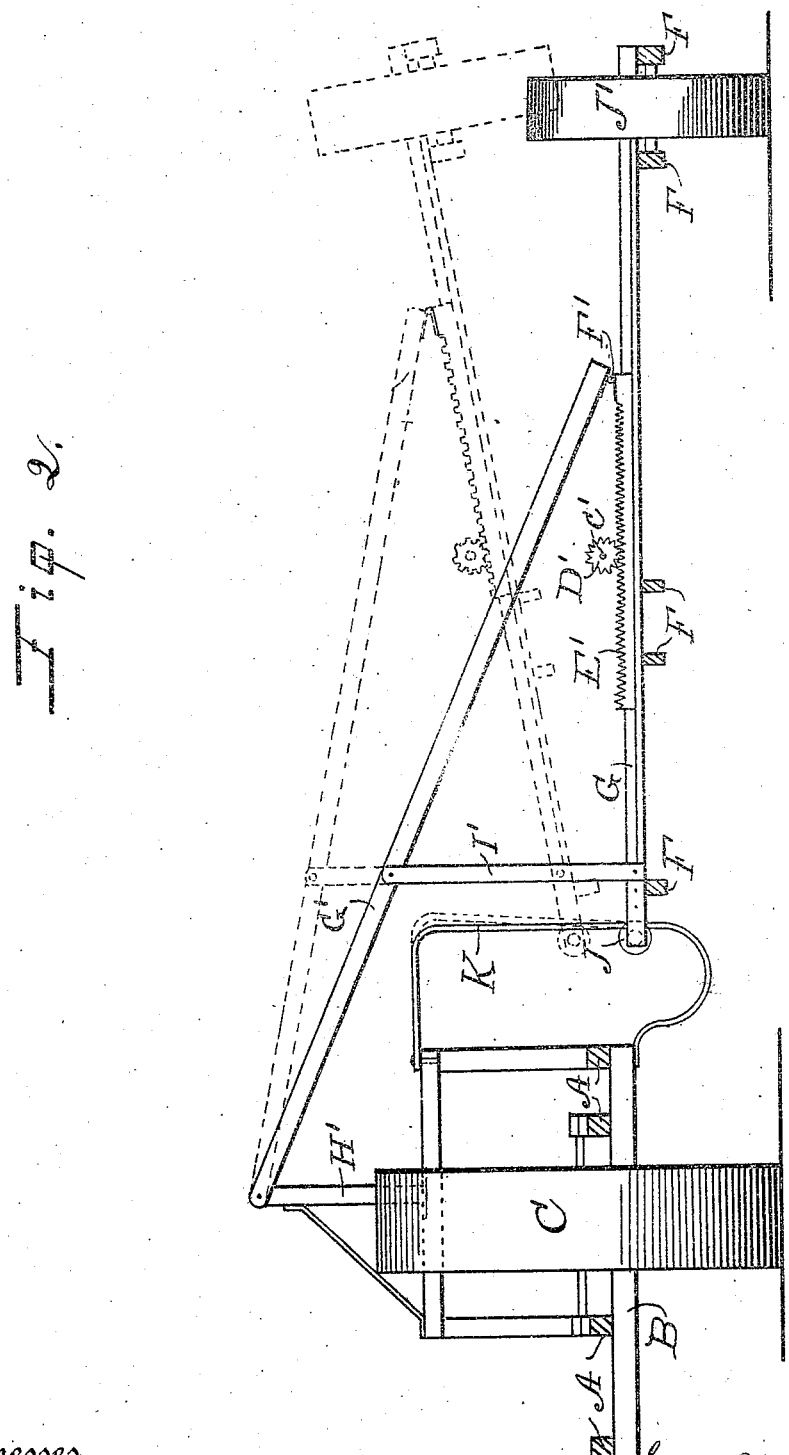

GEORGE W. INGERSOLL, OF STOCKTON, CALIFORNIA, ASSIGNOR OF ONE-HALF TO HERMAN TESCH, OF SAME PLACE.

HARVESTER.

SPECIFICATION forming part of Letters Patent No. 531,535, dated December 25, 1894.

Application filed March 19, 1894. Serial No. 504,276. (No model.)

*To all whom it may concern:*

Be it known that I, GEORGE W. INGERSOLL, a citizen of the United States, residing at Stockton, in the county of San Joaquin and State of California, have invented certain new and useful Improvements in Harvesters; and I do declare the following to be a full, clear, and exact description of the invention, such as will enable others skilled in the art to which it appertains to make and use the same, reference being had to the accompanying drawings, and to the letters of reference marked thereon, which form a part of this specification.
My invention relates to certain improvements in that class of harvesters that cut, thrash and deliver grain into sacks, and it consists of a main frame mounted on a single driving-wheel which is journaled on the center of such main frame so that such main frame may be maintained in a horizontal position on uneven lands, a header frame pivotally connected to such main frame, a balancing beam pivotally attached to a post which is supported by the main frame, such balancing beam being adjustably secured to the header frame, suitable machinery for operating such balancing beam and such other devices and combination of devices as will more fully appear in the specification and be specifically pointed out in the claim, reference being had to the accompanying drawings, in which—

Figure 1 is a plan view of the frame work and the adjusting machinery. Fig. 2 is an enlarged sectional rear end view through line X, X, Fig. 1, with the adjusted positions of some of the parts illustrated by dotted lines.

Similar letter of reference indicate corresponding parts.

A, represents the longitudinal beams of the main frame and B, are the cross beams of the same.

C, is a main driving and bearing wheel which has its axle journaled on the main frame near the center of such frame, and I, is the front supporting wheel.

The wheel C, is provided on either side with main sprocket wheels D and E, which are rigidly attached to such wheel C.

F, are the longitudinal beams and G, are the cross beams of a header frame and H is a brace beam of the same. Such brace beam H is pivotally attached to the inner end of the rear cross beam B. The front cross beam G is provided on its inner end with a traveler wheel J, which engages with a traveler or guide rod K which is rigidly attached to and projects over the side of the main frame.

The main sprocket wheel E engages with a chain belt L which engages a sprocket wheel A' on a shaft M which shaft M is mounted on the main frame and header frame and is provided with a knuckle joint. Such shaft M is provided on its outer end with a sprocket wheel N, which engages a sprocket wheel O by means of a chain belt P, such wheel O being rigidly attached to a shaft Q which is mounted on the header frame. Such shaft Q is provided with a wide pulley R, which pulley R is adapted to engage a straight belt S and a cross belt T. Such belts S and T are adapted to engage pulleys U, V, Y, which are mounted on a shaft Z which is journaled on the beams F. The pulleys U and Y are loosely mounted on such shaft Z and the pulley V is rigidly mounted on such shaft Z.

The shaft Z is provided on one end with a worm B' which engages with a worm wheel Z', such wheel Z' being mounted on a shaft C' which is journaled on the header frame and provided with a pinion D' which engages a cog-rack E' which is adapted to slide transversely on the header frame. Such cog-rack E', is provided at one end with a hinge F' which is attached to such cog-rack E' and to the lower end of an inclined balancing beam G', which beam G' extends upward at an angle and is pivotally attached at its upper end to the top end of a post H', which is mounted on the main frame of the harvester.

The balancing beam G' is provided near the middle of the same with a vertical downwardly extending arm I' which is pivotally attached to the front cross beam G, which arm I' and the beam G' support the weight of the inner end of the header frame.

J' represents the header supporting wheel.

The guide rod K may be adjusted by means of holes K² which adjustment prevents the header spout (not shown) from coming in contact with the body of the machine.

My improved harvester is operated as follows: Suitable power being applied motion is communicated to the pulley R by means of the drive wheel C and the connecting belts, pulleys and shafts.

Should it be desired to operate my machine on land, on which, the header wheel J' is raised higher than the main drive wheel C, the cross belt T is shifted so as to engage the fixedly mounted pulley V, whereby the cog-rack E' through the medium of the mechanism before described is moved outwardly, thus tilting the main frame toward the header frame, thus maintaining the main frame in a horizontal position, when my harvester is on a side hill. Should the wheel J' be depressed, the belt S is shifted so as to engage the pulley V, whereby the main frame is tilted from the header, thus maintaining the main frame in a horizontal position. When the pulley V is disengaged by the belts S and T, the main frame is maintained in rigid position with relation to the header frame.

Having thus described my invention, what I claim as new, and desire to secure by Letters Patent, is—

In a harvester the combination of a main frame, having an upright H' and also having a laterally-disposed guide rod as K, a drive wheel mounted in said main frame, a header frame loosely connected to the main frame and having a traveler wheel engaging the guide rod K, thereof and also having an upright as I', a rack bar E', connected to and adapted to slide upon the header frame, a bar G', loosely connected to the bar E', and also loosely connected to the bars H', and I', of the main frame and header frame, respectively, a shaft C', journaled on the header frame and carrying a pinion engaging with the rack bar E', and gearing intermediate of the drive wheel and the shaft C', all substantially as and for the purpose set forth.

In testimony whereof I affix my signature in presence of two witnesses.

GEORGE W. INGERSOLL.

Witnesses:
MOLBRY HAYNES,
JAMES T. SUMMERVILLE.